Figure 2:
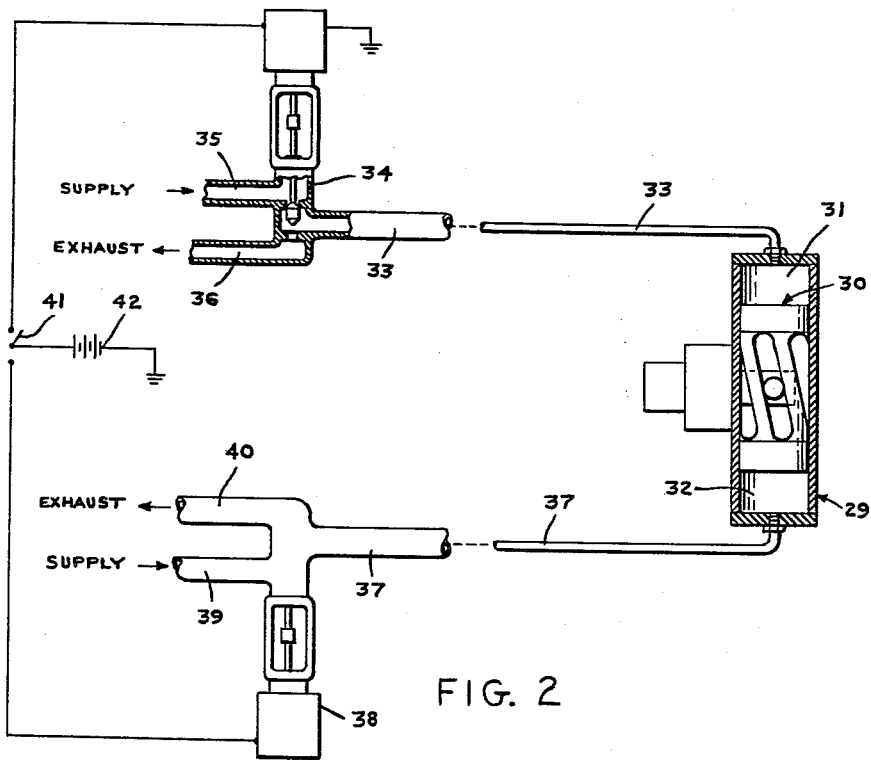

Dec. 3, 1963  H. D. BAUMANN  3,112,654
SELF-LOCKING FLUID OPERATED VALVE ACTUATING MECHANISM
Filed June 22, 1961  3 Sheets-Sheet 1

HANS D. BAUMANN
*INVENTOR.*
BY *Daniel H. Bolio*
*Atty*

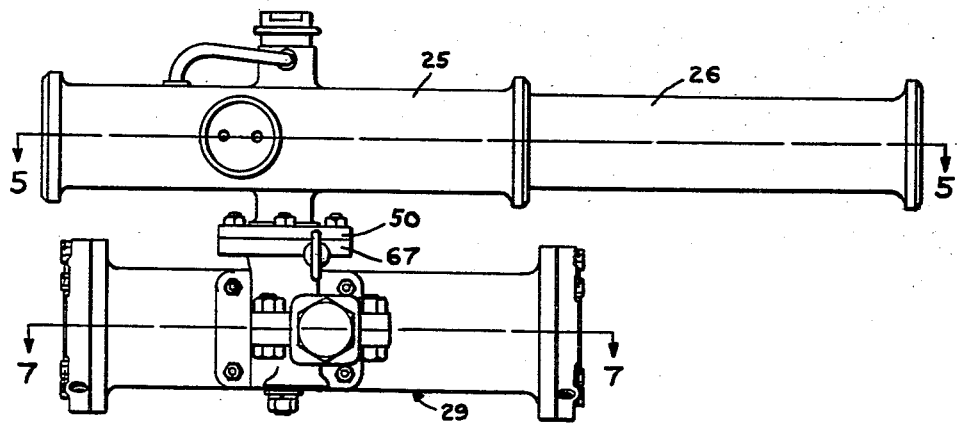
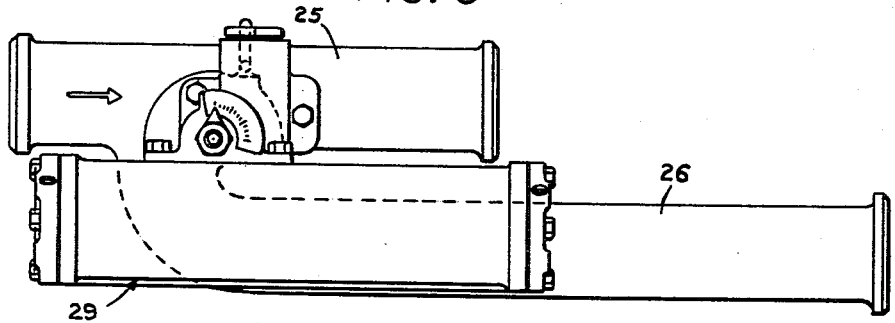
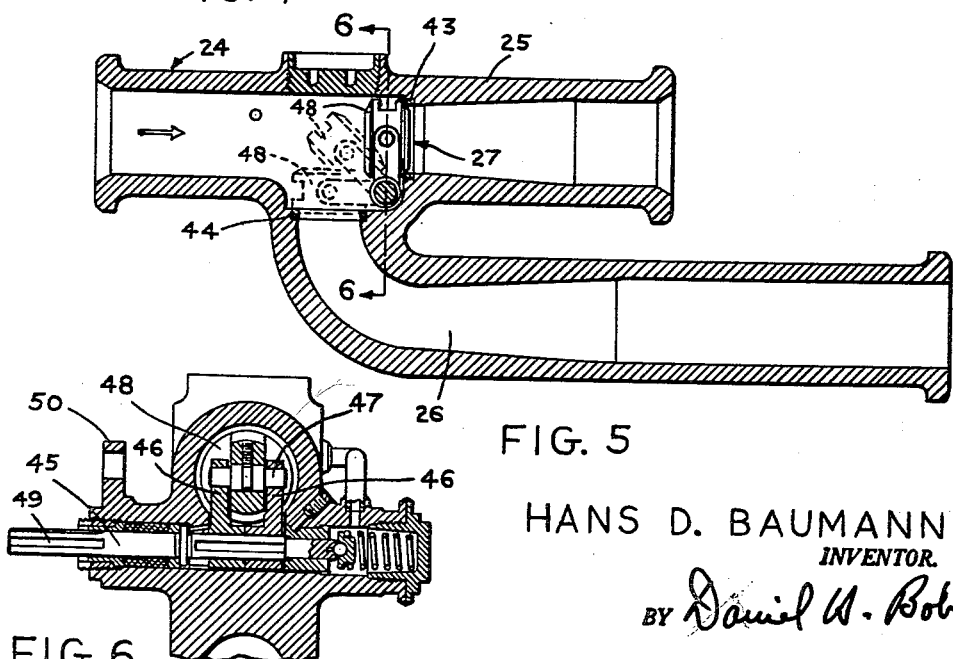

Dec. 3, 1963 H. D. BAUMANN 3,112,654
SELF-LOCKING FLUID OPERATED VALVE ACTUATING MECHANISM
Filed June 22, 1961 3 Sheets-Sheet 3

HANS D. BAUMANN
INVENTOR.
BY Daniel H. Bobis
atty

United States Patent Office 3,112,654
Patented Dec. 3, 1963

3,112,654
SELF-LOCKING FLUID OPERATED VALVE
ACTUATING MECHANISM
Hans D. Baumann, Sharon, Mass., assignor to Worthington Corporation, Harrison, N.J., a corporation of Delaware
Filed June 22, 1961, Ser. No. 118,790
2 Claims. (Cl. 74—110)

This invention relates generally to valve actuation and more particularly to a fluid operated valve actuating mechanism which is self-locking and which is capable of relatively smooth opening and closing when used in a high pressure system.

In certain types of heat exchangers, it is necessary under emergency conditions to divert the cooling water at the outlet end of the heat exchanger so that it will not pass back into the fluid system with which the heat exchanger is associated.

Since these emergency conditions occur very infrequently, the problem exists of providing an actuator for the valve which handles the above mentioned diversion of the cooling water and which operates reliably upon demand, without mechanical failure and without other adverse characteristics, even though the actuator has remained motionless for long periods of time. It is desirable that the valve actuator actuate the valve in a relatively high pressure system with a minimum of applied force, that the valve actuator have a self-locking function so that the relatively high pressures in the controlled system will not cause a reverse action of the valve, and that the valve open and close positively and smoothly without flutter or vibration.

It is an object of the present invention to provide a pneumatically operated valve actuator which is completely reliable under the adverse conditions just described and which will operate smoothly, without binding or sticking, even after remaining motionless in an unfavorable environment for months or years.

A further object of the invention is to provide a valve actuator which presents a relatively simple piston and cam mechanism having a high mechanical advantage relative to the applied force, the mechanism being automatically self-locking in any position in which it is set by the actuator operating pressure, thus preventing undesirable opening or closing of the valve due to back pressures in the controlled system.

Still another object of the invention is to provide an actuator wherein the actuating movement of the pneumatically operated piston is positively opposed in either direction of movement by biasing springs, the said springs tending to balance the unbalanced forces in the actuating mechanism, the application of the balancing forces of said biasing springs being so timed as to occur at the crucial points of valve movement when unbalanced forces are at their greatest, namely, as the valve is first opened and just before the valve closes on its seat.

Figure 1:
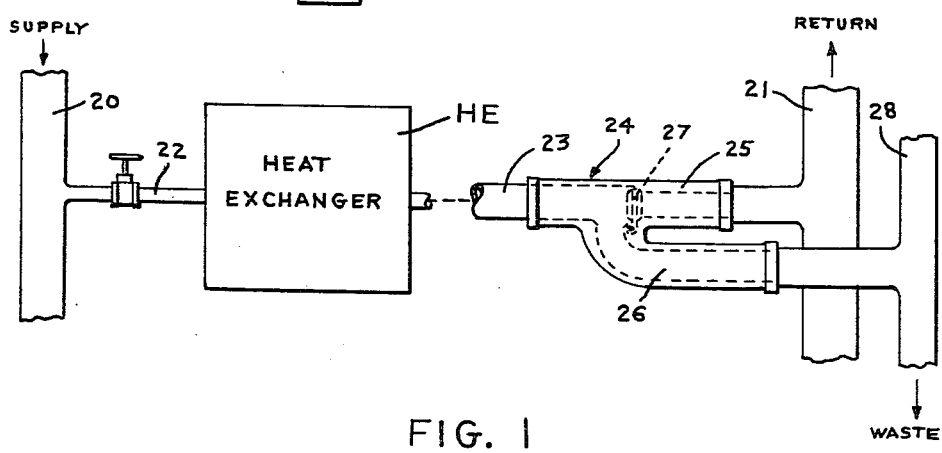
Figure 8:
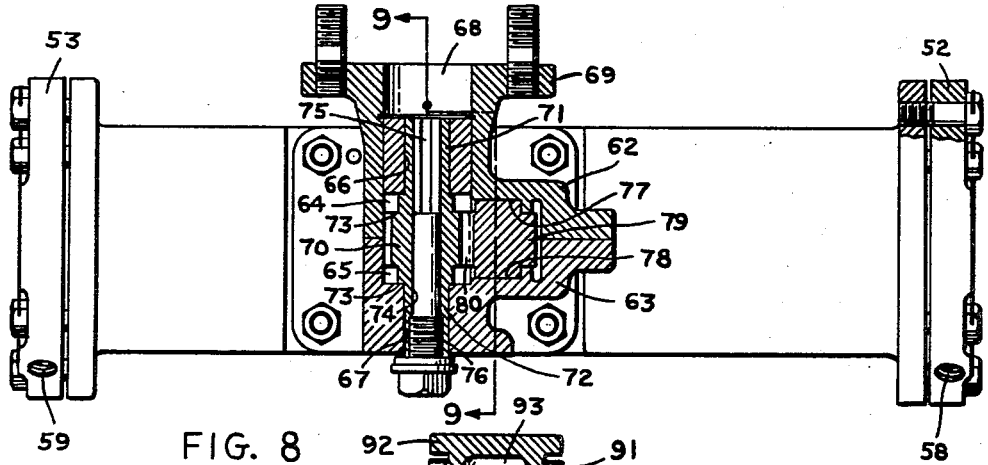
Figure 7:
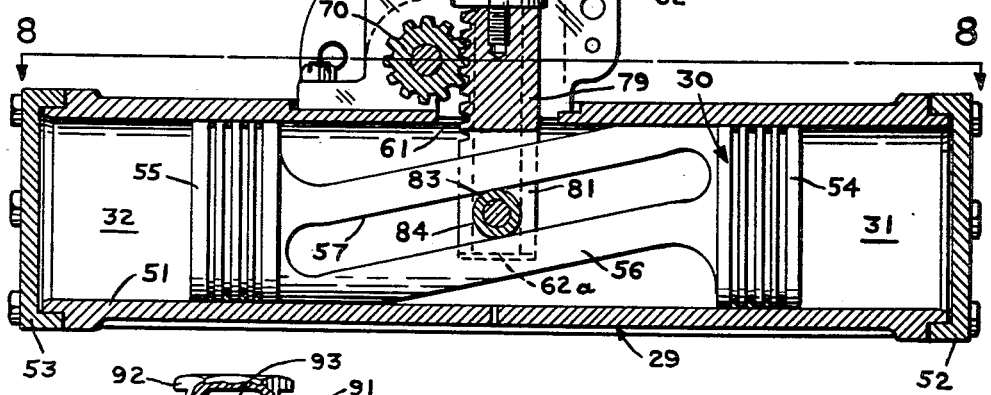
Figure 9:
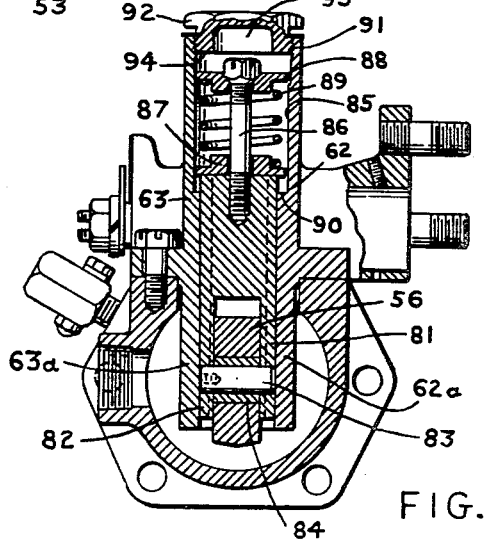

With the above and other objects in view, as will be presently apparent, the invention consists of the following assembly of parts shown in the several views, wherein:

FIGURE 1 is a diagrammatic view showing a typical system to which the actuator is applied and illustrating the control valve and heat exchanger in operative relationship, FIGURE 2 is a diagrammatic view of the electro-pneumatic system associated with the actuator, FIGURE 3 is a top view showing the actuator in operative relation to the through tube and by-pass tube of the heat exchange system fitting which houses the control valve, FIGURE 4 is a side view of the invention as shown in FIGURE 3, FIGURE 5 is a longitudinal, vertical section taken on line 5—5 of FIGURE 3, FIGURE 6 is a partial transverse section taken on the line 6—6 of FIGURE 5, FIGURE 7 is a longitudinal, vertical section taken on the line 7—7 of FIGURE 3, FIGURE 8 is a top view in partial section, taken on the line 8—8 of FIGURE 7, and showing the rack and pinion associated with the piston assembly, and FIGURE 9 is a transverse section taken on the line 9—9 of FIGURE 8.

In the drawings, FIGURE 1 illustrates a typical system to which the actuator of the present invention is applied. The reference numerals 20 and 21 represent the supply and return pipes respectively of a secondary system which is connected to the heat exchanger HE. A valve inlet pipe 22 leads to the heat exchanger and an outlet pipe 23 connects the heat exchanger to the return pipe 21. Interposed in the outlet pipe 23 is a fitting 24, which has the through tube 25 and the by-pass tube 26. The fitting 24 houses the control valve 27 which according to its position directs the fluid by way of the through tube 25 or the by-pass tube 26. The by-pass tube 26 preferably empties into a waste conduit 28.

FIGURE 2 of the drawings illustrates an electro-pneumatic system which is associated with the valve actuator. The actuator, as will presently be described in more detail, has a pneumatic drive, which includes a casing 29 and a reciprocating double-ended piston 30, defining pressure chambers 31 and 32, respectively. The pressure chamber 31 is connected by the conduit 33 to a two-way solenoid operated valve 34. The valve has one port connected to any source of air pressure by the supply pipe 35 and a second port to the exhaust pipe 36. The valve is normally biased so that the exhaust pipe is connected to the conduit 33 when the solenoid is inactivated, the supply pipe being blocked. In a similar manner a conduit 37 connects the pressure chamber 32 to the valve 38. This two-way solenoid operated valve is provided with a supply pipe 39 and exhaust 40. A double throw switch 41 controls the supply of current from the electrical power source 42, and it will be seen that when the solenoid of switch 34 is activated, the solenoid of valve 38 will be inactivated, causing chamber 31 to receive pressure while the chamber 32 exhausts. When the switch is reversed, the chamber 32 receives pressure and the chamber 31 exhausts.

Referring now to FIGURE 5, the through tube 25 is provided with valve seats 43 and 44, respectively. The valve structure does not form a part of the present invention and is known in the art. A shaft 45 is journalled for rotation in the through tube 25. A pair of arms 46 are fixed to the shaft 45 forming a yoke receiving the pintle pins 47 of the valve head 48. It may be noted that the shaft 45 is provided with a splined portion 49 which extends beyond the through tube and the said through tube is provided with a connecting flange 50. Clockwise or counterclockwise torque, applied to the splined portion 49 of the shaft 45, will cause the valve head to seat in the valve seats 43 and 44, respectively.

Reference is now made to FIGURES 7, 8 and 9 which disclose in detail the valve actuator of the present invention. The casing 29 is bored to provide an elongated cylinder bore 51. Cylinder heads 52 and 53 are bolted in place over the ends of the casing 29 and have the usual sealing gaskets. The reciprocating piston assembly 30 includes the opposed piston heads 54 and 55 respectively connected by the rigid web 56 of reduced, rectangular cross-section, the assembly forming a double acting motor. The web 56 has formed therein an angled cam slot 57 and the angle of this slot relative to the longitudinal axis of the casing 29 is critical to the invention.

This relationship will be described later in greater detail. Ports 58 and 59 provide inlet-exhaust openings to the pressure chambers 31 and 32 respectively.

The top wall of the casing 29 is provided with an opening 61, and over the opening is positioned a housing 61, which is bolted to the casing as shown. This housing includes two sections 62 and 63, bolted together as shown.

The sections 62 and 63 are provided with mating recesses 64 and 65 respectively. The section 62 has a through bore 66 which extends from the recess 64 to the recess 68, and the second section 62 further has a mounting flange 69 which mates with and is bolted to the connection flange 50 on the through tube 25. The section 63 likewise has a bore 67 which extends to the exterior of the section. A pinion gear 70 is positioned in the compartment formed by the recesses 64 and 65 and the gear has tubular extensions 71 and 72 which are journalled in the bores 66 and 67 respectively. The said tubular extensions are stepped as at 73, and these stepped portions engage the end walls of the recess 64 and 65 to center the gear 70. The gear 70 and its tubular sections are provided with an elongated bore 74. The end of the bore 74 in the direction of the mounting flange 69 is provided with interior splines, and this end receives the corresponding splined end 46 of shaft 45 when the actuator is mounted on the fitting 24. The opposite end of the bore is provided with a plug 76.

The housing 61 is further provided with mating recesses 77 and 78 which provide a guideway for a sliding rack 79. The rack is provided with teeth 80 which mesh with the teeth of the pinion gear 70. The sections 62 and 63 have depending portions 62a and 63a which extend into the cylinder bore 51. These portions are likewise recessed to form extensions of the recesses 77 and 78 and form support for the gear rack.

The lower end of the rack is slotted to form bifurcations 81 and 82 which straddle the web 56, the web sliding freely therebetween. A pin 83 extends between and is secured to the said bifurcations, and on the pin 82 is rotatably mounted a roller 84. The diameter of the roller 84 is such that the roller fits closely in the cam slot 57, without undue play, but is freely movable along the cam slot.

The upper end of the housing 61 is further recessed to provide a bore 85, which is in the nature of an enlarged extension of the rack guideway. A headed bolt 86 is threadedly engaged with and extends from the upper end of the sliding rack 79. This bolt carries the freely slidable discs 87 and 88. These discs are forced toward the opposite ends of the bolt 86 by a compression spring 89, which is prestressed when the parts are in assembled relationship.

It will be noted that the juncture between the rack guideway formed by the recesses 77 and 78 and the lower end of the bore 85 defines a stop shoulder 90. The upper end of the bore 85 is provided with threads 91, which receive a cap nut 92. The cap nut 92 is provided with a relatively deep recess 93 which is larger in diameter than the headed bolt 86, defining a stop shoulder 94.

It may be pointed out that the distance between the stop shoulders 90 and 94 is greater than the distance between the outer surfaces respectively of the discs 87 and 88, when the valve is in neutral position. These relative distances are adjustable to some degree by the threaded positioning of the bolt 86 and the cap nut 92. For a portion of its travel on either side of the neutral position, because of the relationship just pointed out, the gear rack moves freely without compressing the biasing spring 89. After a short distance, however, the disc 87 will contact the stop shoulder 90 or the disc 88 will contact the stop shoulder 94 and the spring will be compressed resisting and balancing the unbalanced force of the piston and the fluid acting on the valve head 48.

As pointed out above, the angle of the cam slot 57 relative to the longitudinal axis of the piston housing 29 is critical to the invention. This angle is such that the tangent of the angle is less than the coefficient of the friction between the piston heads 54 and 55 and the housing 29. It has been determined that, by means of this relationship, the piston and therefore the control valve will automatically remain locked in any position in which the piston is left by the controls. Thus, if a strong back pressure force is placed on the control valve 27 by fluid pressures in the system, tending to rotate the gear and move the rack, the piston will not be moved by the reverse thrust but will remain locked, locking the valve. In the way of example, of the relationship set forth if the coefficient of friction between the metal surfaces (piston heads and cylinder walls) is .20, then the angle of the cam slot 57 is made less than 11° 19′.

Operation

The operation of the invention is as follows:

In the operation of the actuator, under normal conditions, it is desired that the valve 27 remain fully open in the dotted line position of FIGURE 5, resting tightly against the seat 44 and blocking off the by-pass tube 26.

Accordingly, the switch 41 is closed. The solenoid moves the valve 34 to supply position, closing the exhaust, and causing pressure to build up in the chamber 31, forcing piston head 54 to the left. Valve 38, not being activated and being spring biased to exhaust position, will allow pressure in the chamber 32 caused by movement of the piston 55 to escape through the exhaust pipe 40. As the pistons move to the left, the roller 84 rides in the cam slot 57 and the gear rack 79 is moved upwardly, causing the pinion gear 70 to move in a counterclockwise direction. This causes the valve 27 to pivot in a counterclockwise direction, and the valve is forced against its seat 44. The pressure in the chamber 31 is therefore indefinitely maintained and the fluid circuit is from the supply pipe 20, through the heat exchanger HE, through the fitting 24 and into the return pipe 21.

It will be noted that as the piston moves to the left in the described operation, and while the piston is in the neutral or central position, the discs 87 and 88 are moving freely in the bore 85 and no spring pressure is exerted on the gear rack. However, as the gear rack 79 continues to move upwardly, the disc 88 moves into contact with the stop shoulder 94. The disc 88 will then slide downwardly on the headed bolt 86, the spring being compressed. The compression will increase until the piston reaches its limit of travel to the left and the valve closes tightly on its seat 44. Thus the maximum balancing spring pressure will occur just as the valve is subjected to its greatest unbalanced pressures, namely, just as it closes on its seat 44.

In the event of a breakdown in the heat exchanger, an alarm signal will indicate that fact, and the switch 41 will be promptly reversed to deactivate the valve 34 and activate the valve 38. Automatic means may be provided, if desired, to sense the breakdown of the heat exchanger and cause the reversal of the said switch 41.

Upon such reversal, the valve 34 will move to exhaust position, permitting pressure to exhaust from the chamber 31. The valve 38 will move to supply position, admitting pressure to the chamber 32.

The pistons 55 and 54 will now move to the right, and the cam roller 84 will cause the sliding rack 79 to move downwardly. The gear 70 will turn in a clockwise direction and the valve 27 will start to lift from its seat 44. Compression on the spring 89 will be released gradually and then will be completely released as the valve reaches the midpoint or intermediate position shown in dotted lines in FIGURE 5, the disc 88 leaving the stop shoulder 94. As the pistons move further to the right the disc 87 will engage the stop shoulder 90 and the spring will again be gradually compressed, the maximum compression occurring as the valve 27 reaches its seat 43, the unbalanced force again being very great.

As soon as the valve 27 closes on its seat 43, flow to the return pipe 21 is cut off and the fluid in the heat exchanger, which may be contaminated, is by-passed into the waste pipe 28. The valve 27 will remain locked on its seat 43, no matter what may be the reverse pressure, since the design of the structure is such that downward pressure of the gear cannot move the pistons. The actuator is therefore self locking and the valve opens and closes smoothly and without flutter or vibration.

While there has been shown and described herein the preferred embodiments of the invention, it should be understood that minor changes may be made without departing from the spirit and scope of the invention as claimed.

What is claimed is:

1. An actuating mechanism for use with a diverting valve operated by a pinion gear and rack associated therewith, said actuating mechanism comprising:
   (a) a valve actuating motor having a housing,
   (b) a reciprocating member slidable in the housing,
   (c) power means for the above actuating motor,
   (d) the reciprocating member having a cam surface thereon disposed at an acute angle to the longitudinal axis of the reciprocating member,
   (e) a connecting link means slidable in the housing,
   (f) the link means having a cam follower thereon operatively engaged with the cam surface,
   (g) the link means extending transversly of the longitudinal axis of the reciprocating member,
   (h) the link means adapted to be operatively associated with said pinion gear and rack and to activate said valve on operation of the valve actuating motor,
   (i) means including a compression spring on the link means whereby the spring is restrained against the extension thereof but freely compressible from either end,
   (j) opposed spaced stop shoulders carried by said housing,
   (k) the spring being positioned between the stop shoulders.

2. The combination claimed in claim 1 wherein:
   (a) said last named means comprises a stud carried by the link means,
   (b) the stud having abutments at opposite ends thereof,
   (c) a compression spring positioned between the abutment,
   (d) a bore in the housing receiving the stud and the spring,
   (e) said opposed stop shoulders being in the bore at the opposite ends of the spring.

References Cited in the file of this patent
UNITED STATES PATENTS

| | | |
|---|---|---|
| 1,423,403 | Davis et al. | July 18, 1922 |
| 1,905,047 | Norin | Apr. 25, 1933 |
| 1,958,262 | Boland | May 8, 1934 |
| 2,478,832 | McManis | Aug. 9, 1949 |
| 2,529,457 | Nilsson | Nov. 7, 1950 |
| 2,709,451 | LaBour | May 31, 1955 |
| 2,856,131 | Conlan | Oct. 14, 1958 |
| 2,912,215 | Forrester | Nov. 10, 1959 |
| 2,953,344 | Yancey | Sept. 20, 1960 |
| 2,963,260 | Siravo | Dec. 6, 1960 |